United States Patent
Adorno

(10) Patent No.: US 8,898,921 B1
(45) Date of Patent: Dec. 2, 2014

(54) MULTI-FUNCTIONAL MEASURING TAPE

(76) Inventor: David Adorno, Oviedo, FL (US)

( * ) Notice: Subject to any disclaimer, the term of this patent is extended or adjusted under 35 U.S.C. 154(b) by 241 days.

(21) Appl. No.: 13/543,168

(22) Filed: Jul. 6, 2012

(51) Int. Cl.
*G01B 3/10* (2006.01)

(52) U.S. Cl.
CPC ............ *G01B 3/1071* (2013.01); *G01B 3/1056* (2013.01); *G01B 3/1082* (2013.01)
USPC .............................................. 33/765; 33/761

(58) Field of Classification Search
CPC .. G01B 3/1082; G01B 3/1005; G01B 3/1056; G01B 3/1041; G01B 2003/1053; G01B 2003/1064; G01B 2003/1046; G01B 2003/1041; G01B 2003/1043
USPC ............................ 33/755, 765, 759, 761, 769
See application file for complete search history.

(56) References Cited

U.S. PATENT DOCUMENTS

| | | | |
|---|---|---|---|
| 1,816,846 A | 8/1931 | Harvey | |
| 2,714,196 A | 7/1955 | Melehan | |
| 3,425,271 A | 2/1969 | Hendry | |
| 3,731,389 A * | 5/1973 | King | 33/668 |
| 4,281,461 A * | 8/1981 | Roe | 33/760 |
| 4,506,451 A * | 3/1985 | Hiltz | 33/451 |
| 4,574,486 A * | 3/1986 | Drechsler | 33/765 |
| 4,578,867 A * | 4/1986 | Czerwinski et al. | 33/765 |
| 4,700,489 A * | 10/1987 | Vasile | 33/342 |
| 5,062,215 A * | 11/1991 | Schlitt | 33/755 |
| 5,512,840 A | 4/1996 | Nogaki | |
| 5,894,677 A * | 4/1999 | Hoffman | 33/758 |
| 6,223,446 B1 * | 5/2001 | Potter | 33/764 |
| 6,433,530 B1 | 8/2002 | Pool | |
| 6,526,673 B1 * | 3/2003 | Reed | 33/761 |
| 6,848,139 B2 | 2/2005 | Simon et al. | |
| 6,860,031 B2 * | 3/2005 | Odachowski | 33/755 |
| 6,971,185 B2 * | 12/2005 | Scarborough | 33/765 |
| 7,228,644 B1 * | 6/2007 | Hellem et al. | 33/760 |
| 7,676,950 B2 * | 3/2010 | Ogilvie | 33/770 |
| 8,590,170 B2 * | 11/2013 | Wagner | 33/760 |
| 2005/0034320 A1 * | 2/2005 | Connor | 33/760 |
| 2005/0166417 A1 * | 8/2005 | Clapper | 33/759 |
| 2005/0183280 A1 * | 8/2005 | Scarborough | 33/765 |
| 2006/0042110 A1 * | 3/2006 | Buchner | 33/755 |
| 2009/0271999 A1 * | 11/2009 | Alker | 33/762 |

* cited by examiner

*Primary Examiner* — Yaritza Guadalupe-McCall
(74) *Attorney, Agent, or Firm* — Robert C. Montgomery; Montgomery Patent & Design

(57) ABSTRACT

A multi-functional tape measure is provided with a top-mounted viewing window which reads a bottom surface of a coiled measuring tape for providing interior distance measurements using measuring indicia disposed on the bottom surface of the tape. The bottomside measuring indicia has an applied correction factor to compensate for the size of the housing and provide the dimension needed. The tape measure is also provided with a level for indication of a surface that is level and plumb. Further, the tape measure is provided with a fold-out locking T-square mechanism.

17 Claims, 12 Drawing Sheets

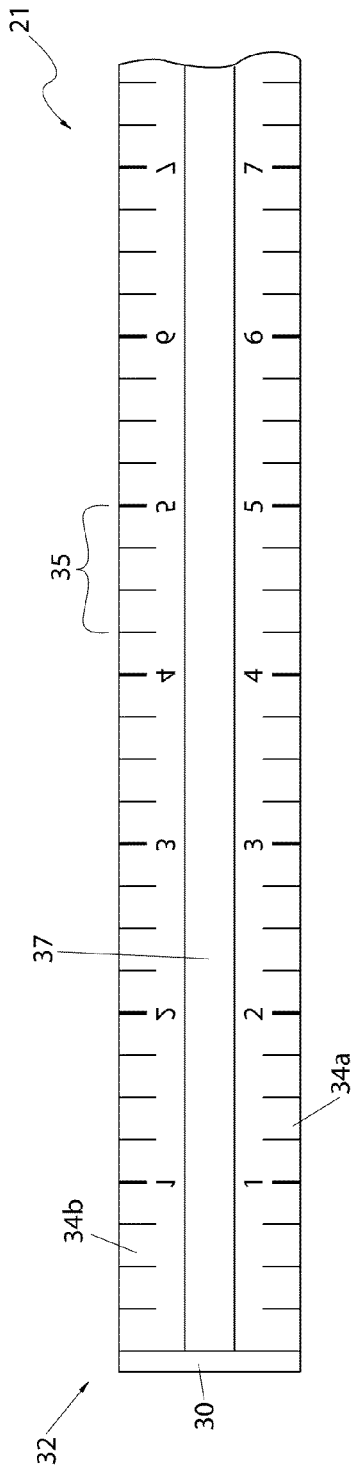
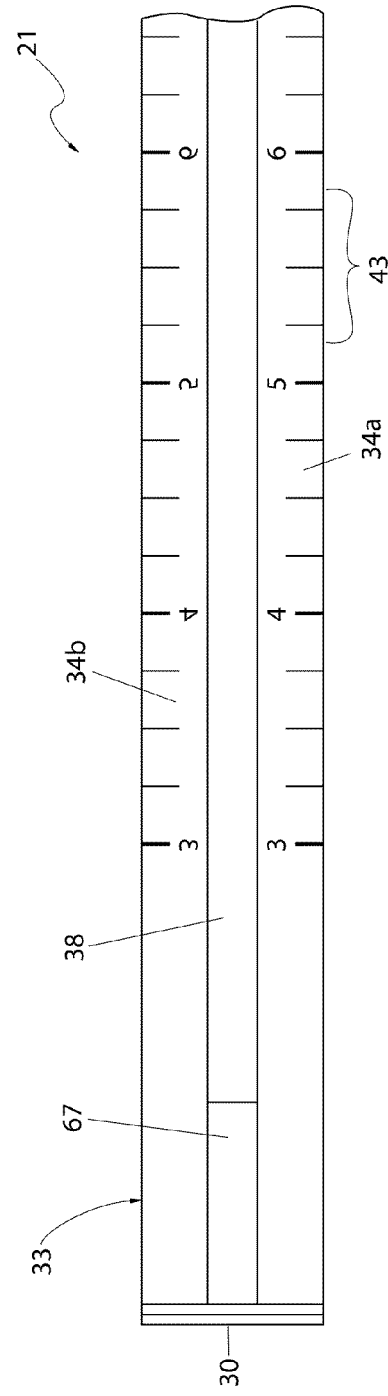
Fig. 3
Fig. 4

MULTI-FUNCTIONAL MEASURING TAPE

RELATED APPLICATIONS

Not Applicable.

FIELD OF THE INVENTION

The present invention relates generally to measuring devices, and in particular, to a multi-functional tape measure that provides for measuring exterior and interior dimensions of a work surface, measuring the inclination of a work surface, and marking right angles upon a work surface.

BACKGROUND OF THE INVENTION

One (1) of the most common tools found in the toolbox of a contractor or do-it-yourselfer is the tape measure. It is used in all stages of a project, from the beginning planning stages through detailed design, construction, and final inspection, since it provides extremely accurate measurements at a minimal cost. Tape measures typically include a flexible measuring tape coiled within a housing. The measuring tape includes incremental measuring indicia on its top surface for measuring distances. In use, the measuring tape is extended from the housing to a desired point in order to measure the distance of a work surface.

The main disadvantages of these measuring devices are the inaccuracy of the measured distance and the lack of versatility. While most tape measures can make inside measurements, they typically rely on the somewhat inaccurate observation of the measuring markings at a corner of the work surface as the measuring tape is bent around the corner or at the exit of the housing. Such measurements can easily be an eighth of an inch off or more. Even if such measurements could be accurately taken, tape measure placement is critical to ensure square and level measurements at perpendicular locations. This often forces the user to not only carry a level and a square, but often times having to use more than one tool simultaneously to get an accurate measurement.

SUMMARY OF THE INVENTION

The inventor has recognized the aforementioned inherent problems and lack in the art and observed that there is a need for a device that can accurately measure exterior and interior distances at a square and plumb position. The principles of the present invention provide for a multi-functional tape measure to address the identified needs.

Accordingly, it is an object of the present embodiments of the invention to address this need by providing a device that provides properly oriented upright measuring indicia from both a right side and a left side.

It is another object of the present invention to provide a device that provides measuring indicia for easily measuring distances between exterior points and interior points of a work surface.

It is another object of the present invention to provide a device that provides for identification of a vertical and horizontal inclination angle.

It is another object of the present invention to provide a device that provides for simple determination of a right angle.

The inventor has thus realized the advantages and benefits of providing a multi-functional tape measuring device having various features for accomplishing at least one (1) of the aforementioned objects.

A feature of the present invention is to provide a device that a housing formed by a first section and a second section having an opening disposed in a lower front side of the housing. A coiled measuring tape is disposed within the housing having a free end that is extendable from the opening while a remainder of the measuring tape remains coiled. A topside measuring indicia is disposed linearly along a top surface of the measuring tape having a measuring scale initiating at the free end. The topside measuring indicia includes left-handed indicia extending along a left side of the top surface and opposingly oriented right-handed indicia extending along a right side of the top surface. A bottomside measuring indicia is disposed linearly along a bottom surface of the measuring tape having an altered measuring scale initiating at a point inward of the free end. The bottomside measuring indicia includes left-handed indicia extending along a left side of the bottom surface and opposingly oriented right-handed indicia extending along a right side of the bottom surface. A viewing window is disposed in a top side of the housing to display an upper portion of the coiled measuring tape. The measurement of distance displayed through the viewing window is equivalent to a combined length of the measuring tape extended through the opening and a length of the housing.

Another feature of the present invention is that the measuring scale includes a plurality of equally spaced markings adapted to measure a distance between the free end and the opening of the housing. The altered measuring scale includes a plurality of unequally spaced markings having a correction factor adapted to measure a distance between the free end and a rear side of the housing.

Another feature of the present invention is that the device is provided with a vertical level disposed on a right side of the housing for indicating vertical angles of inclination and a horizontal level also disposed on the right side of the housing for indicating horizontal angles of inclination.

Another feature of the present invention is that the device is provided with a T-square blade pivotably attached to the housing adapted to form a right angle relative to the housing when in a deployed position and a lip extending from a bottom side of the housing. The housing includes a slot having an open side in the right side of the housing for receiving the blade when in a stowed position.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 3 is a top plan view of a section of measuring tape of the multi-functional tape measure;

FIG. 4 is a bottom plan view of the section of measuring tape;

Figure 1:
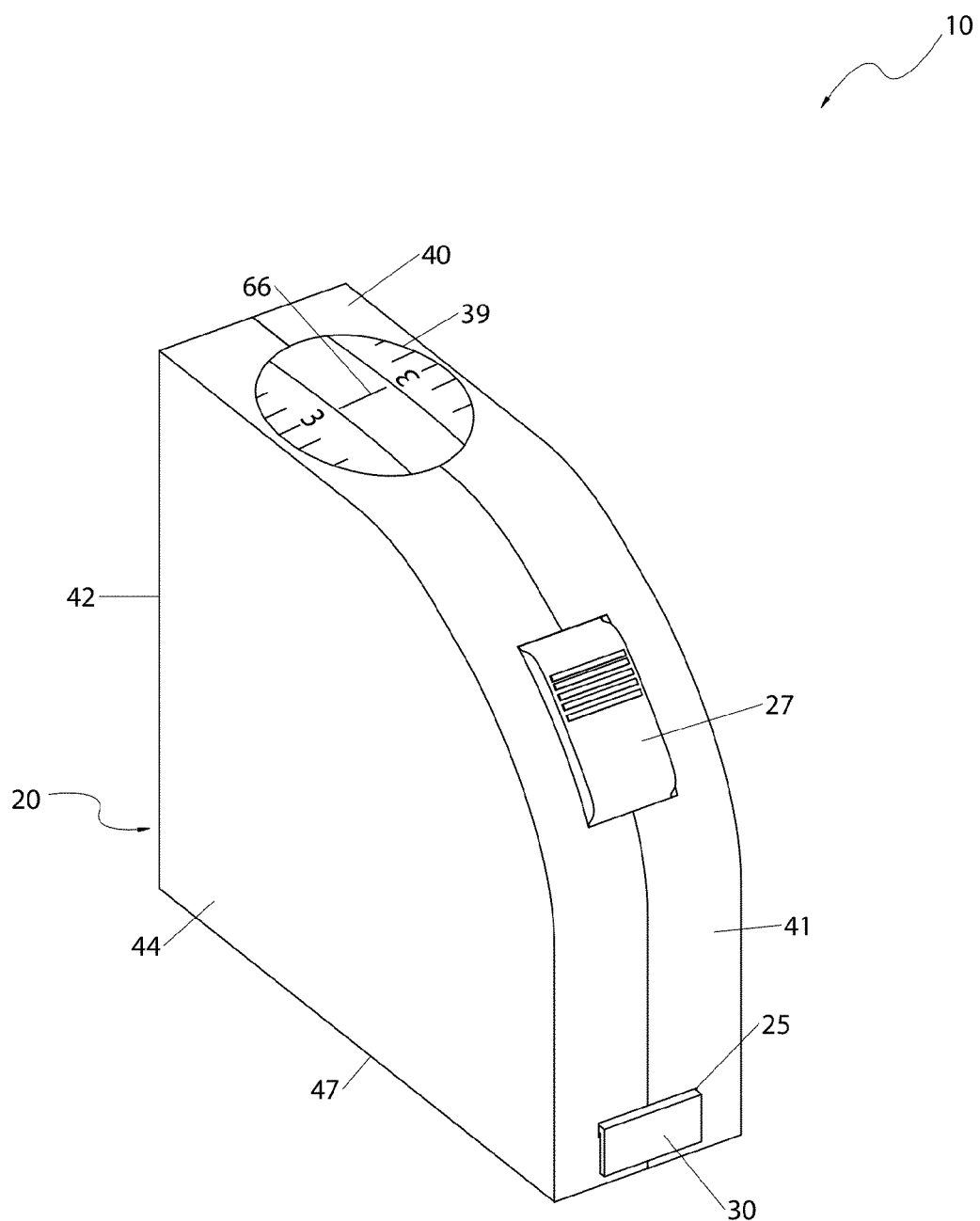
FIG. 1 is a perspective right side view of a multi-functional tape measure in accordance with the present invention.

DESCRIPTIVE KEY 10 multi-functional tape measure
20 housing
21 measuring tape
22 interior
23 first section
24 second section
25 opening
25a first half opening
25b second half opening
26 spool assembly
27 tape locking mechanism
28 actuator
29 press mechanism
30 hook
31 retainer
32 top surface
33 bottom surface
34 measuring indicia
34a left-handed indicia
34b right-handed indicia
35 measuring scale
36 housing left side
37 topside measuring indicia
38 bottomside measuring indicia
39 viewing window
40 housing top side
41 housing front side
42 housing rear side
43 altered measuring scale
44 housing right side
45 positioning mechanism
46 level
46a horizontal level
46b vertical level
47 housing bottom side
48 T-square mechanism
49 blade
50 attached end
51 slot
52 outer blade
53 inner blade
54 channel
55 stop
56 channel guide
57 recess
58 groove
59 retaining pin
60 pin lower end
61 blade aperture
61a stowed blade aperture
61b deployed blade aperture
62 spring
63 pin head
64 blade fastener
65 housing fastener
66 cross hair
67 auto-stop strip
68 clip
69 orifice
70 lever tab
71 lever tab lower end

DETAILED DESCRIPTION OF THE PREFERRED EMBODIMENT

In accordance with the invention, the best mode is presented in terms of the present embodiments, herein depicted within FIGS. 1 through 13. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Referring now to FIGS. 1 through 13, depicting a multi-functional tape measure, where like reference numerals represent similar or like parts. In accordance with the teachings of the present disclosure and identified generally by reference to a device 10 that provides an improved measuring tape constructed to measure exterior dimensions and interior dimensions from both a left and a right-sided orientation.

The device 10 generally includes a housing 20 which encloses an elongated, flexible measuring tape 21. The housing 20 is a generally six-sided enclosure having a hollow interior 22 for storing the measuring tape 21. The housing 20 is divided into a first section 23 and a second section 24 attached together by at least one mechanical fastener 65, adhesives, or other suitable fastening means. In the example embodiment, the first and second sections 23, 24 generally divide the housing 20 into two (2) halves and each provides approximately half of the volume of the interior 22. It can be appreciated that in another embodiment of the device 10, the first section 23 can be a base of the housing 20 essentially providing the entire volume of the interior 22 and the second section 24 is an attached cover.

Figure 2:
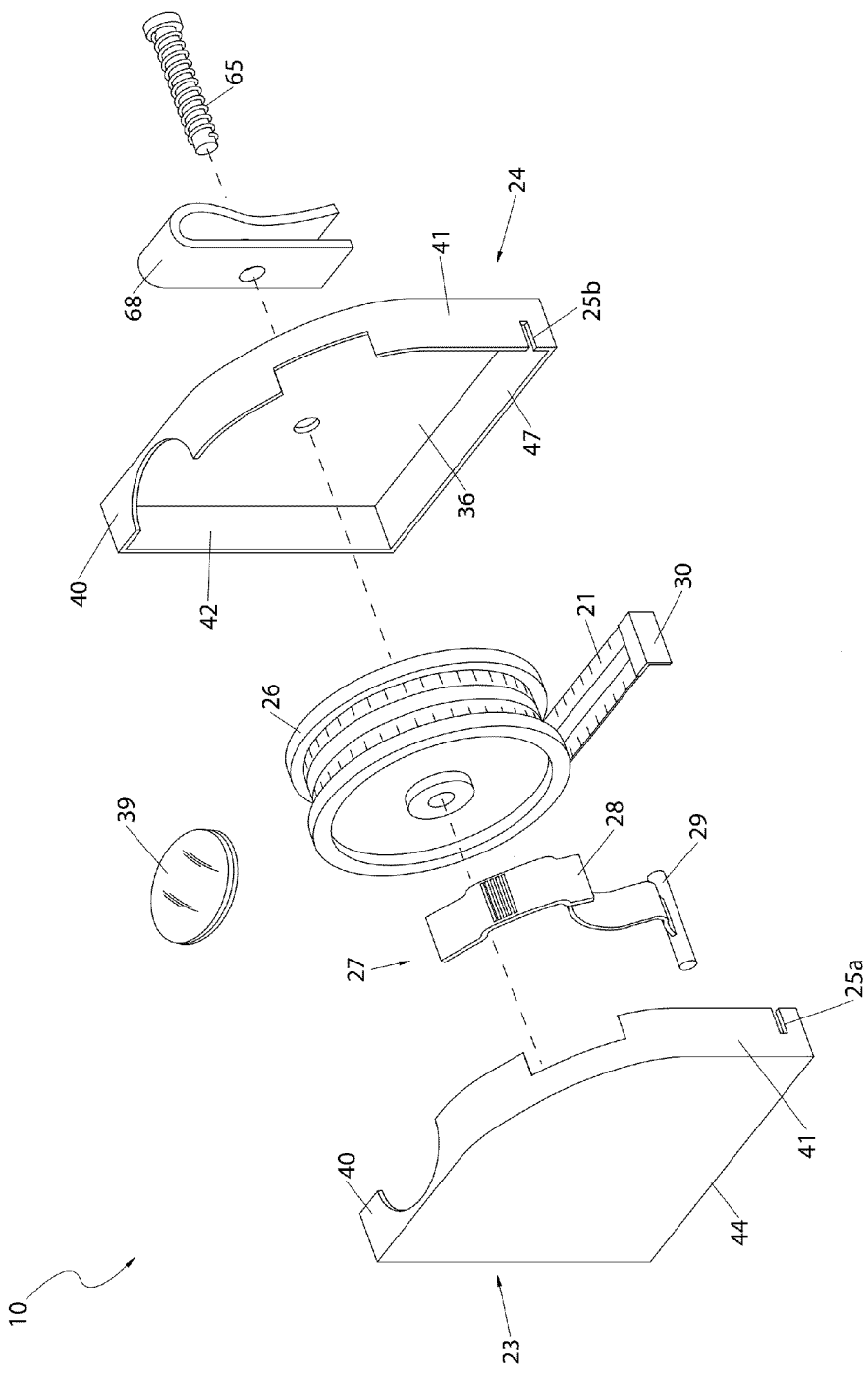
FIG. 2 is an exploded view of the multi-functional tape measure.
Figure 5:
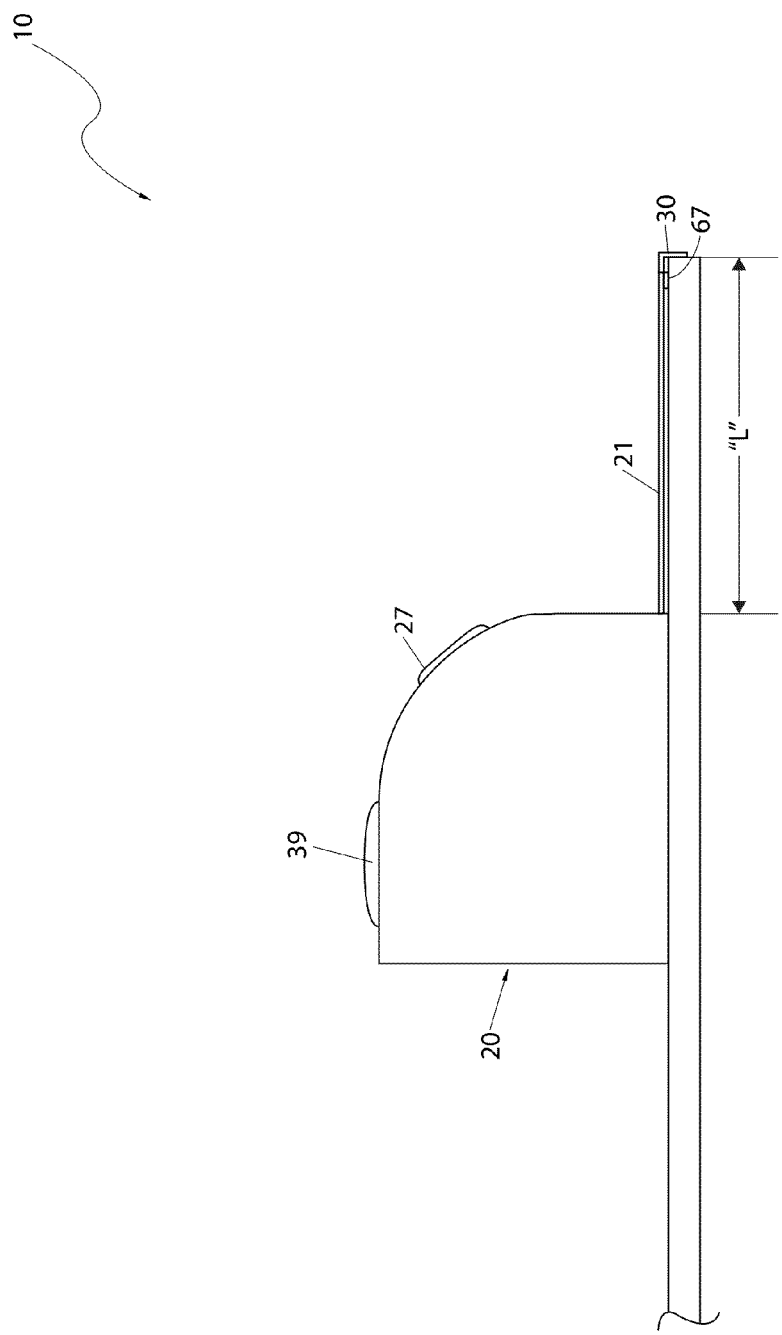
FIG. 5 is a side elevation view of the multi-functional tape measure shown measuring an exterior dimension.
Figure 9:
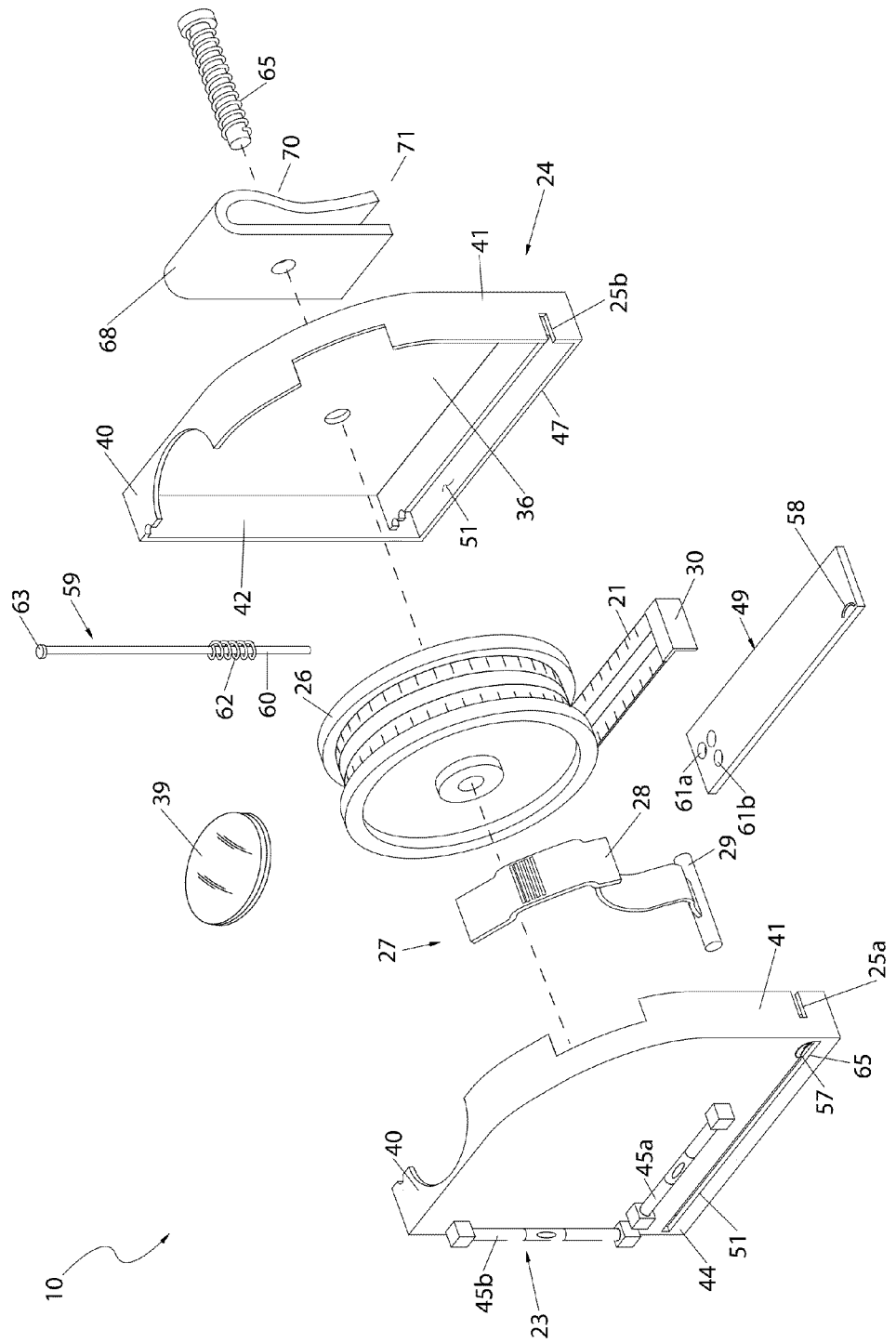
FIG. 9 is an exploded view of the embodiment of the multi-functional tape measure of FIG. 8.

The measuring tape 21 is movable between an extended position and a retracted position within the housing 20. It can be appreciated that the extended position includes any position where at least some portion of the measuring tape 21 is extended outward from the housing 20 and the retracted position is when the measuring tape 21 is completely retracted within the housing 20. A free end of the measuring tape 21 extends linearly outward from the housing 20 through an opening 25 formed in the lower front side 41 of the housing 20. As best seen in FIGS. 2 and 9 of the example embodiments, the opening 25 includes two (2) half openings 25a, 25b each formed in a lower front side of the first section 23 and the second section 24, respectively.

The free end of the measuring tape 21 also includes a generally "L"-shaped stop or hook 30 affixed to the measuring tape 21 and extending perpendicularly therefrom. The hook 30 allows the free end of the measuring tape 21 to be hooked to an edge of the work surface to be measured and prevents the free end of the measuring tape 21 from being completely retracted within the housing 20. A forward edge of the hook 30 corresponds to the "zero" ("0") mark of a measuring scale 35 provided on the measuring tape 21.

The measuring tape 21 is wound or otherwise coiled around a spring actuated spool assembly 26 having a conventional flanged cylindrical body rotatably attached to opposing interior surfaces of the sections 23, 24 about a central axis of rotation and an attached recoil spring. In certain embodiments, the axis of rotation is defined by a central housing fastener 65, as best seen in FIGS. 2 and 9. An end of the measuring tape 21 opposite the free end is affixed to the cylindrical body of the spool assembly 26 and includes a retainer 31 to prevent the end of the measuring tape 21 from being completely extended outside the housing 20 through the opening 25. The retainer 31 is an outwardly protruding member or rib extending from a top surface 32 and bottom surface 33 of the measuring tape 21, adjacent to the spool assembly 26 having a thickness larger than that of the opening 25. The retainer 31 can be integral, clipped, adhered, or otherwise fastened into position upon the measuring tape 21.

Figure 10:
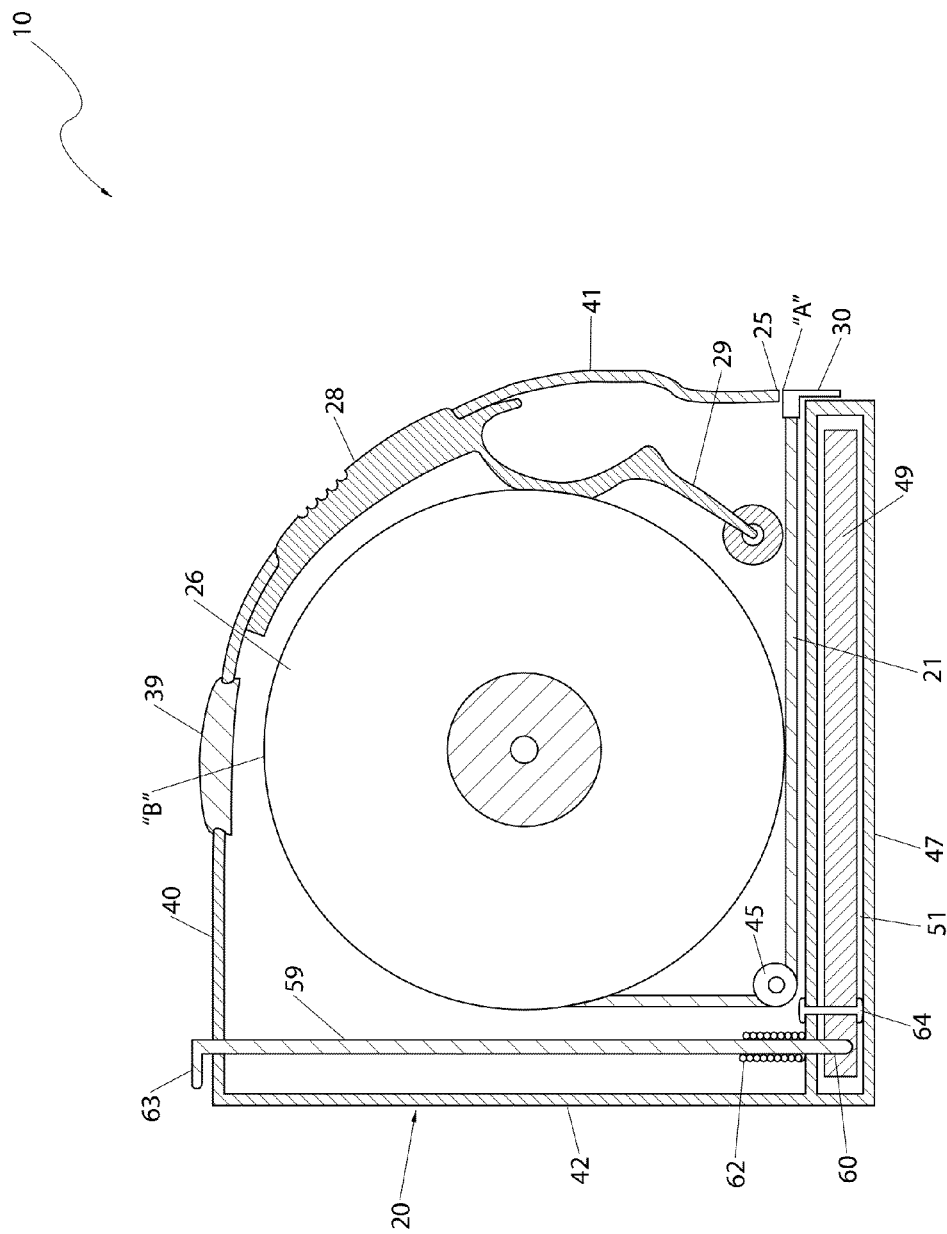
FIG. 10 is a cross-sectional view of the embodiment of the multi-functional tape measure of FIG. 8 taken along line A-A.
Figure 11:
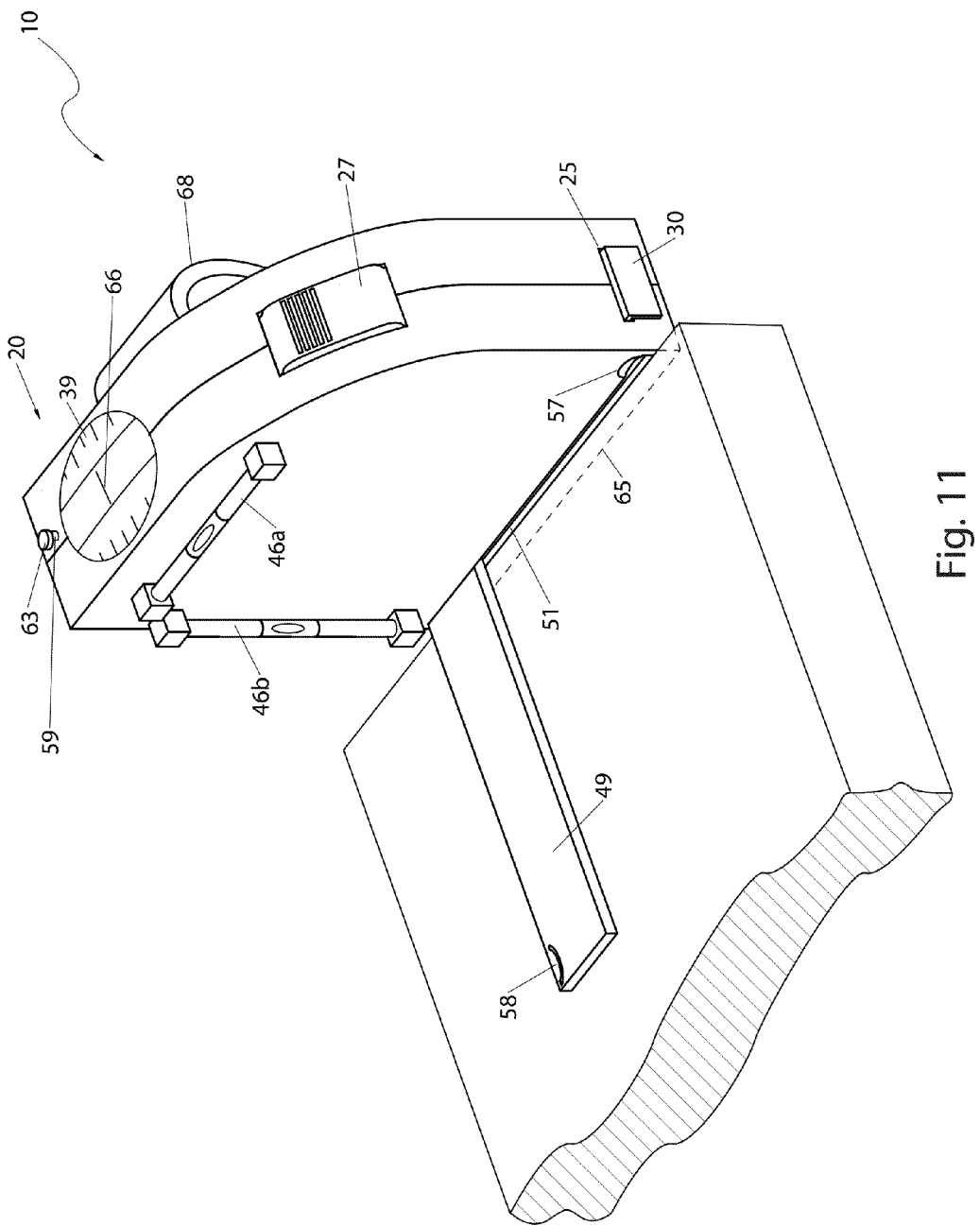
FIG. 11 is an environmental perspective view of the embodiment of the multi-functional tape measure of FIG. 8 shown on a work surface with a T-square mechanism in a deployed position.

The spool assembly 26 enables movement of the measuring tape between the manually extended position and the automatically retracted position in a conventional manner. As best seen in FIGS. 2, 9, and 10 of the example embodiments, a tape locking mechanism 27 is provided for retaining the measuring tape 21 at a selected extended position. The tape locking mechanism 27 generally includes an actuator 28 movably attached to the housing 20 and a press mechanism 29 mechanically connected to the actuator 28. The actuator 28 can be slidably actuated, press-button actuated, pivotably actuated, or the like in order to change the position of the press mechanism 29 in relation to the measuring tape 21.

The press mechanism 28 is movable between an engaged position and a disengaged position in response to actuation of the actuator 28. In the engaged position, a lower end of the press mechanism 28 makes suitable frictional contact with either the measuring tape 21, or the spool assembly 26, or both in order to pinch, press, hold, or otherwise retain the measuring tape 21 at the selected extended position. In the disengaged position, the press mechanism 28 is upwardly moved and disengages allowing the spool assembly 26 to recoil, thus automatically retracting the measuring tape 21.

The components which enable movement of the measuring tape 21 between the extended and retracted position and which enable locking of the tape measure 21 at the selected extended position, including the spool assembly 26 and the tape locking mechanism 27, function in a substantially similar manner as similar components well known to conventional tape measures and are therefore not described in any further detail.

Certain embodiments of the device 10 also includes a flexible clip 68 is fastened or otherwise removably or permanently attached to a flat left side 36 of the housing 20. The clip 68 allows a user to attach the device 10 to a belt, a tool belt, a waist of pants, or similar support for carrying the device 10 when not in use. For embodiments of the device 10 which do not include a level indicator for determining inclination, the clip 68 can be of a conventional configuration as shown in FIG. 2. For embodiments of the device 10 which include at least one level indicator for determining inclination, the clip 68 can either not be used or attached to the housing 20 or can have an alternate configuration, as will be described in more detail below.

The measuring tape 21 includes measuring indicia 34 disposed linearly along both the top and bottom surfaces 32, 33 provided in a selected measuring scale 35. The measuring scale 35 can be any sequence of numbers or symbols that are spaced apart and used to measure units of distance. The measuring indicia 34 include both left-handed indicia 34a and right-handed indicia 34b. Preferably, the left-handed indicia 34a are disposed linearly along a left edge of the measuring tape 21 and the right-handed indicia 34b are disposed linearly along a right edge of the measuring tape 21. During use by a left-handed user or when viewing the left side of the device 10, the left-handed indicia 34a are upright and the right-handed indicia 34b are upside down. Alternatively, during use by a right-handed user or when viewing the right side of the device 10, the right-handed indicia 34b are upright and the left-handed indicia 34a are upside down. By providing both left and right-handed indicia 34a, 34b; a user can measure and mark the work surface being measured on either side without having to read some measurements upside down, change position, or rotate the orientation of the tape measure.

It can be appreciated that the measuring indicia 34 can be sized differently along the length of the measuring tape 21 in order to distinguish certain units of length from other units of length. Furthermore, the measuring indicia 34 can also include different colors or emphasis markings, such as underlining, bolding, stud centering markings, etc., in order to distinguish certain units of length from other units of length.

As best seen in FIG. 3, topside measuring indicia 37 are evenly spaced apart across the top surface 32 of the measuring tape 21 to suitably measure straight-line exterior distances in a conventional manner. The measuring scale 35 of topside measuring indicia 37 can be any suitable interval of measuring, such as one-sixteenth inch (1/16 in.), one-eighth inch (1/8 in.), or similar measuring unit. The measuring scale 35 is depicted at a one-quarter inch (1/4 in.) unit for clarity of illustration. Additionally, the measuring scale 35 of topside measuring indicia 37 can be either English or Metric measuring units. Topside measuring indicia 37 include both left and right-handed indicia 34a, 34b as described above. Topside measuring indicia 37 are used and read in a conventional manner when viewing the top surface 32 of the measuring tape 21 when in the extended position.

As best seen in FIG. 4, bottomside measuring indicia 38 are non-evenly spaced apart across the bottom surface 33 of the measuring tape 21 in order to suitably measure straight-line interior distances. Bottomside measuring indicia 38 include both left and right-handed indicia 34a, 34b as described above. Bottomside measuring indicia 38 are used and read when viewing the bottom surface 32 of the measuring tape 21 through a viewing window 39 located in a top side 40 of the housing 20, when the measuring tape 21 is in the extended position.

Figure 7:
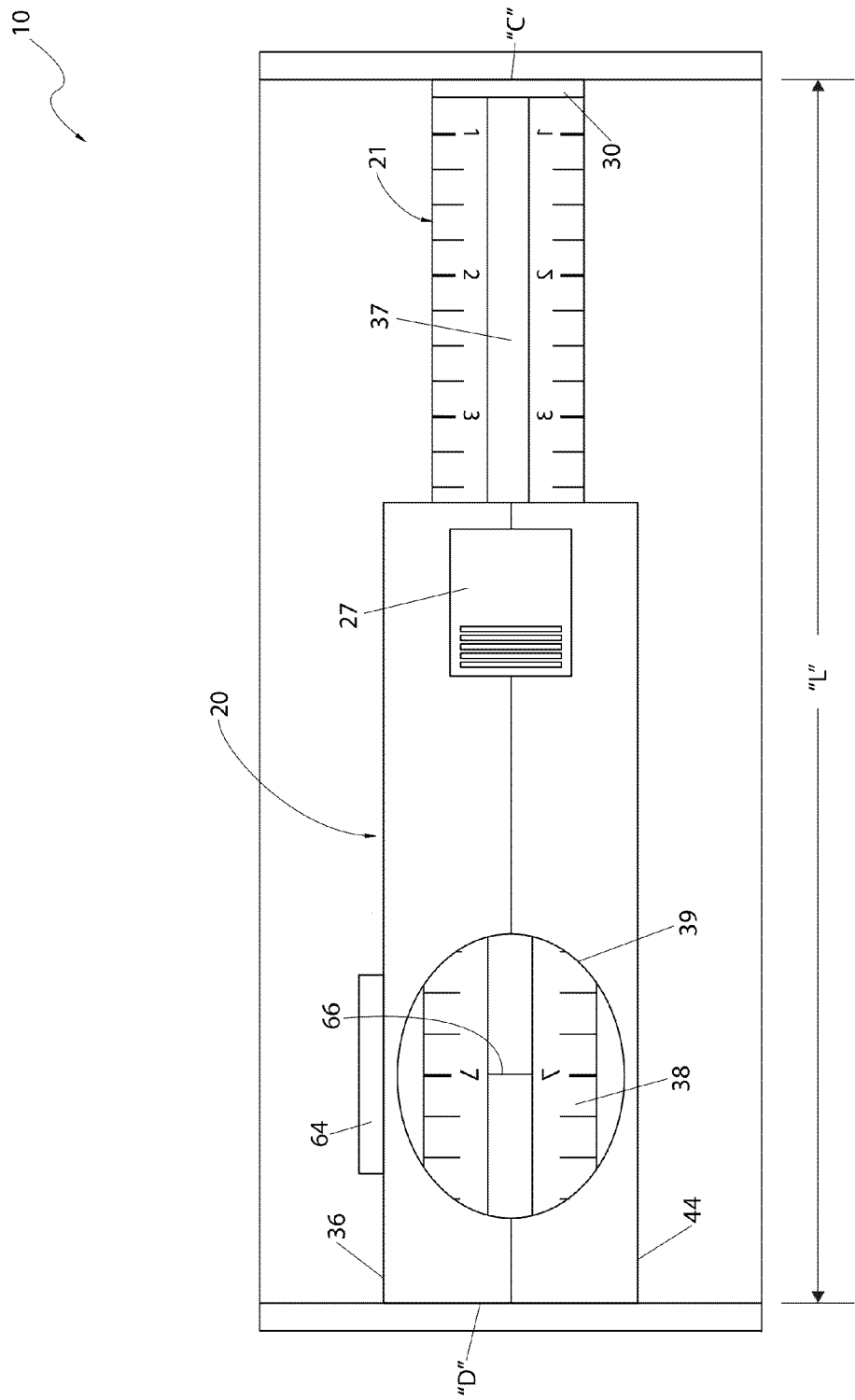
FIG. 7 is a top plan view of the multi-functional tape measure shown measuring an interior dimension.
Figure 8:
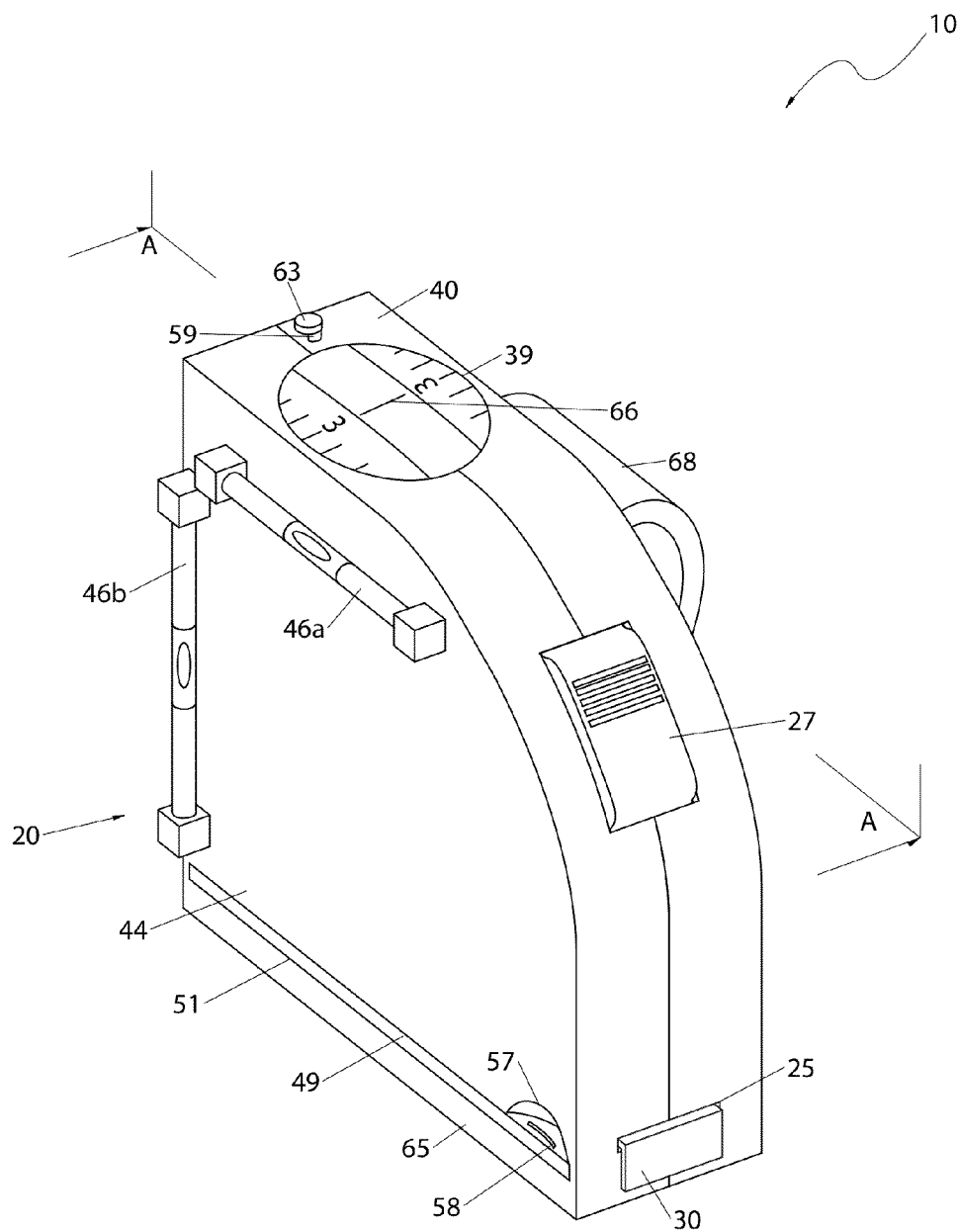
FIG. 8 is a side perspective view of an alternate embodiment of the multi-functional tape measure in accordance with the present invention.

As best seen in FIGS. 7 and 8, the viewing window 39 is an opening disposed at an approximately central location upon the housing top side 40 and covered by a transparent window member. The viewing window 39 provides for top-reading of the measured distance, preferably utilized when measuring internal distances. The upper portion of the bottom surface 33 of the coiled measuring tape 21 is viewable through the viewing window 39 when the device 10 is used to measure interior distances. The viewing window 39 is illustrated as being generally ovular in shape; however it can be appreciated that the general shape of the opening and window member can take on practically any geometric shape. In certain embodiments, the viewing window 39 can be a magnifying lens to provide magnification of bottomside measuring indicia 38. The viewing window 39 can also include a central mark or cross-hair 66 extending laterally across the window member to provide alignment with the plurality of measuring marks of bottomside measuring indicia 38.

Bottomside measuring indicia 38 includes an altered measuring scale 43 having an applied correction factor. The altered measuring scale 43 is envisioned to be a logarithmic scale measurement, such that each discrete measuring point of bottomside measuring indicia 38 corresponds to a discrete measuring point of topside indicia 37 plus the applied correction factor which equals the combined length of the extended portion of the measuring tape 21 and the length of the housing 20 from front side 41 to rear side 42. The altered measuring scale 43 of bottomside measuring indicia 38 can be any suitable interval of measuring, such as one-sixteenth inch (1/16 in.), one-eighth inch (1/2 in.), or similar measuring unit. The altered measuring scale 43 is depicted at a one-quarter inch (1/4 in.) unit for clarity of illustration. Additionally, the altered measuring scale 43 of bottomside measuring indicia 38 can be either English or Metric measuring units.

In certain embodiments of the device 10, the top surface 32 and the bottom surface 33 of the measuring tape 21 can have different and complimentary colors to further distinguish use of the device 10 between measuring exterior dimensions and interior dimensions. For example, the top surface 32 can have a yellow color and the bottom surface 33 can have a blue color.

The bottom surface 33 of the measuring tape 21 also includes an auto-stop strip 67 disposed about the transverse center of the measuring tape 21 at the free end adjacent to the hook 30. The auto-stop strip 67 is made of a suitable compressible material having a thickness approximately equivalent to the thickness of the opening 25, preferably approximately one-sixteenth inch (1/16 in.) to one-eighth inch (1/2 in.) thick. The auto-stop strip 67 slows the measuring tape 21 as it is automatically retracted into the housing 20 to protect the free end and the hook 30 from possible damage. The compressible material of the auto-stop strip 67 allows for complete insertion of the measuring tape 21 within the housing 20 through the opening 25.

As seen in FIG. 4, the first measuring mark for bottomside measuring indicia 38 is equal to the length of the housing. As seen in FIGS. 1,4,7, and 8 of the example embodiments, the length of the housing 20 is three inches (3 in.). Accordingly, in the exampled embodiments, bottomside measuring indicia 38 indicates a three inch (3 in.) measured length when the measuring tape 21 is fully retracted. It can be appreciated that the length of the housing 20 can vary and as such, so will the origin or first measuring mark of bottomside indicia 38.

The correction factor accounts for the difference in the length of the housing 20, i.e., the distance between the housing front side 41 and the housing rear side 42; and the internal length of measuring tape 21, i.e., the distance between the opening 25 (reference point "A") and an upper-most point upon the circumference of the coiled measuring tape 21 (reference point "B"). The correction factor provides the altered measuring scale 43 of bottomside measuring indicia 38 to correctly and accurately indicate an interior distance between two (2) points.

It can be appreciated that the internal layout and configuration of the measuring tape 21 between points "A" and "B" can be of various designs which will impact and determine the length of measuring tape 21 between points "A" and "B", and thus the correction factor of the altered measuring scale 43. The example embodiment shown in FIG. 10 includes at least one (1) positioning mechanism 45, such as an axle, a roller, or the like; which extends between interior walls of the housing 20 from left side 36 to right side 44 to guide the path of the measuring tape 21. The measuring tap 21 extends outwardly from the coil past the positioning mechanism 45 in route to the opening 25. The positioning mechanism 45 provides for a constant length of a section of the measuring tape 21 between the positioning mechanism 45 and point "A"; which will limit a correction factor variable to the distance between the positioning mechanism 45 and point "B", based upon the diameter of the coiled measuring tape 21, the curvature of the measuring tape 21, and the angle of extension between the positioning mechanism 45 and point "B".

Figure 6:
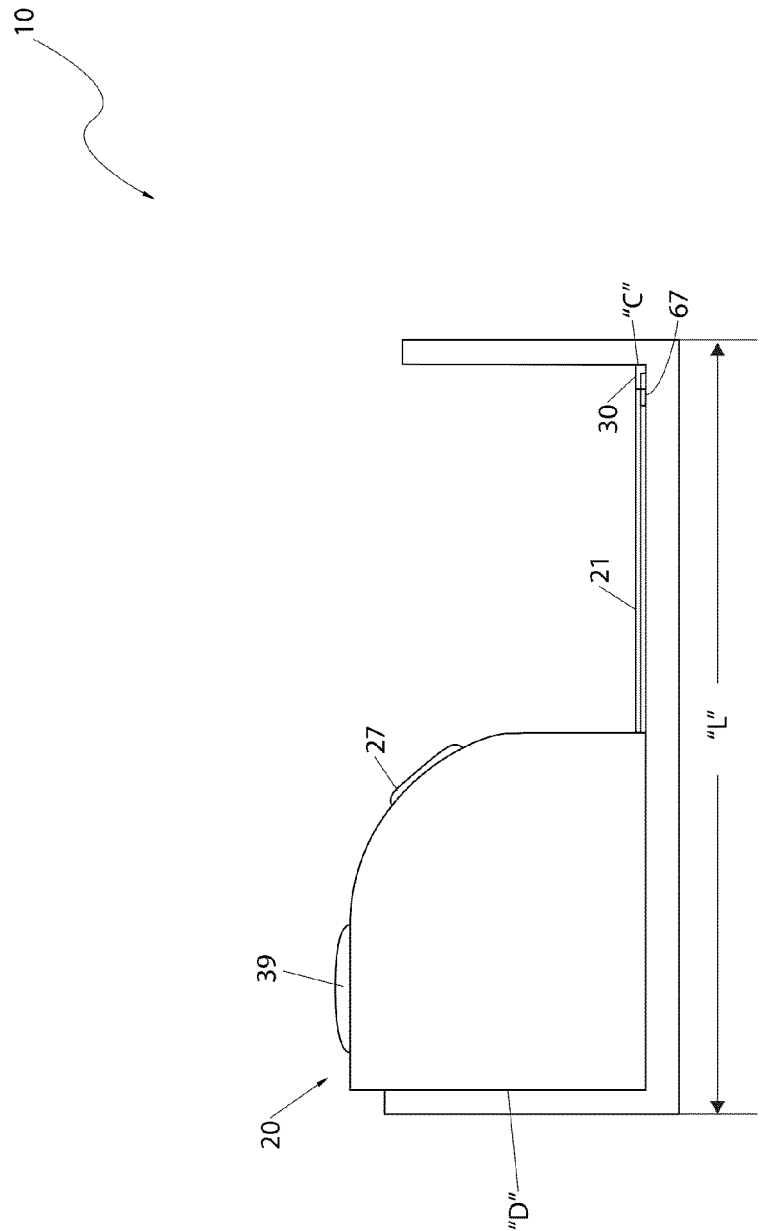
FIG. 6 is a side elevation view of the multi-functional tape measure shown measuring an interior dimension.

An example of use for measuring interior distances is best seen in FIGS. 6 and 7. The free end of the measuring tape 21, at the hook 30, is placed in contact with an interior point (reference point "C") of the distance to be measured, length "L", and corresponds to the "zero" ("C") mark of the altered measuring scale 43. The surface of the housing rear side 42 is placed in contact with a correspondingly opposed and aligned interior point (reference point "D"). The measurement shown through the viewing window 39 will be equal to the combined length of measuring tape 21 extending outward from the housing 20 and the length of the housing 20. Thus, length "L" is accurately shown as the measured length on the bottom surface 33 of the measuring tape 21 through the viewing window 39.

Other embodiments of the device 10 include additional features which provide further multi-use functionality. A pair of levels 46 is provided for determining the inclination of the work surface. Each level 46 is preferably a small bubble vial incorporated into the housing right side 44. The bubble vial includes a pair of spaced apart centering markings which indicate that the surface is level by the position of the air bubble within the vial. A horizontal level 46a is disposed adjacent to an upper or a lower edge of the housing right side 44 and provides for leveling determination when a bottom side 47 of the housing 20 is placed on a surface. The horizontal level 46a is depicted adjacent to the upper edge of the housing right side 44 in FIGS. 8 and 11 and is depicted adjacent to the lower edge of the housing right side 44 in FIG. 9 to illustrate example locations of the different embodiments of the device 10. A vertical level 46b is disposed adjacent to a rear side edge of the housing right side 44 and provides for leveling determination when the housing rear side 42 is placed on a surface. The levels 46 can be recessed within the thickness of the first section 23, housing right side 44, or can protrude outwardly therefrom. Preferably, as shown in the example embodiment, levels 46 that protrude outwardly have a perimeter edge to protect the bubble vials from damage when the device 10 is placed on its right side. The housing bottom side 47, housing rear side 42, and housing left side 36 are each completely flat and the levels 46a, 46b, respectively, are parallel thereto in order to give accurate inclination readings.

Figure 13:
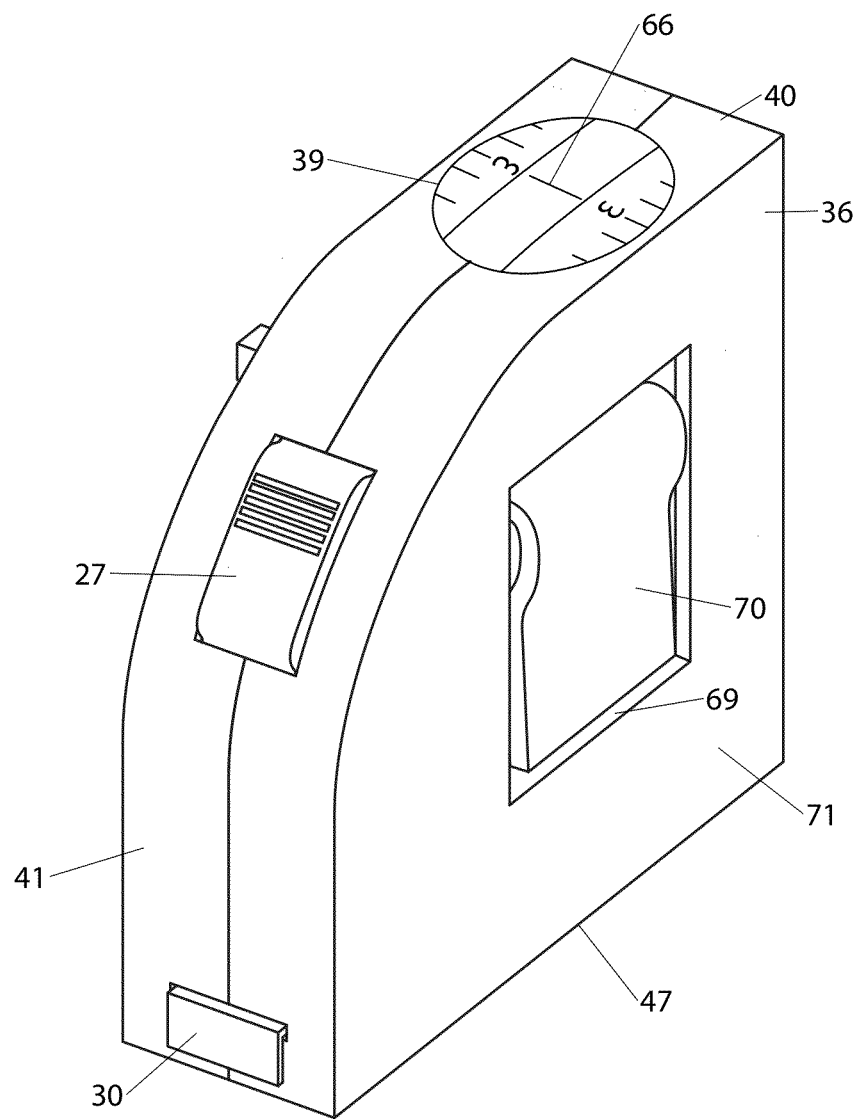

As described above, for embodiments of the device 10 including at least one level indicator for determining inclination, the housing left side 36 must remain flat and parallel to the levels 46a, 46b. As best seen in FIGS. 9 and 13, for embodiments of the device 10 which include both the levels 46a, 46b and the clip 68, the housing 20 includes a clip orifice 69 which is recessed within the thickness of the housing left side 36. The orifice 69 is suitably dimensioned to completely receive the clip 68 such that the housing left side 36 is flat and can make flush contact with a work surface when determining inclination or to scribe a square line from a level surface. A lower end 71 of a lever tab 70 of the clip 68 bends outwardly to be gripped by the user to pull the lever tab 70 outwardly in order to attach the device 10 to a belt or waistline by the clip 68. Alternatively, the clip 68 can have a lever tab 70 having a wide and flat outer surface which is parallel to the levels 46a, 46b.

As shown in FIGS. 8-12, other embodiments of the device 10 include a T-square mechanism 48 for quickly providing a right-angle square with a rotatable blade 49 for making marks and quickly determining right-angles. The blade 49 is rotatably attached to the rear end of the housing 20 within a slot 51 by a blade fastener 64. As best seen in FIG. 8-10 the housing bottom side 47 is of a suitable thickness to include the slot 51 for receiving the blade 49 when rotated in a stowed position. The slot 51 is approximately the length of the housing 20 from the rear side 41 to the front side 41. An attached end 50 of the blade 49 is pivotably connected to the housing 20 within the slot 51 by the blade fastener 64 and is outwardly rotatable to a ninety degree (90°) angle relative to housing right side 44 in a deployed position. The blade fastener 64 is preferably a rivet or similar smooth shafted permanent mechanical fastener.

A lip 52 is formed by or extends past the lower edge of the housing bottom side 47 below the slot 51. The lip 52 provides a flat surface for abutment with an edge of a work surface in a similar manner as the head of a conventional T-square. The blade 49 provides a straight edge for marking and can include additional measuring or marking indicia for measuring or marking the distance from the edge of the work surface. The blade 49 is envisioned to have a length slightly smaller than the length of the slot 51.

Figure 12:
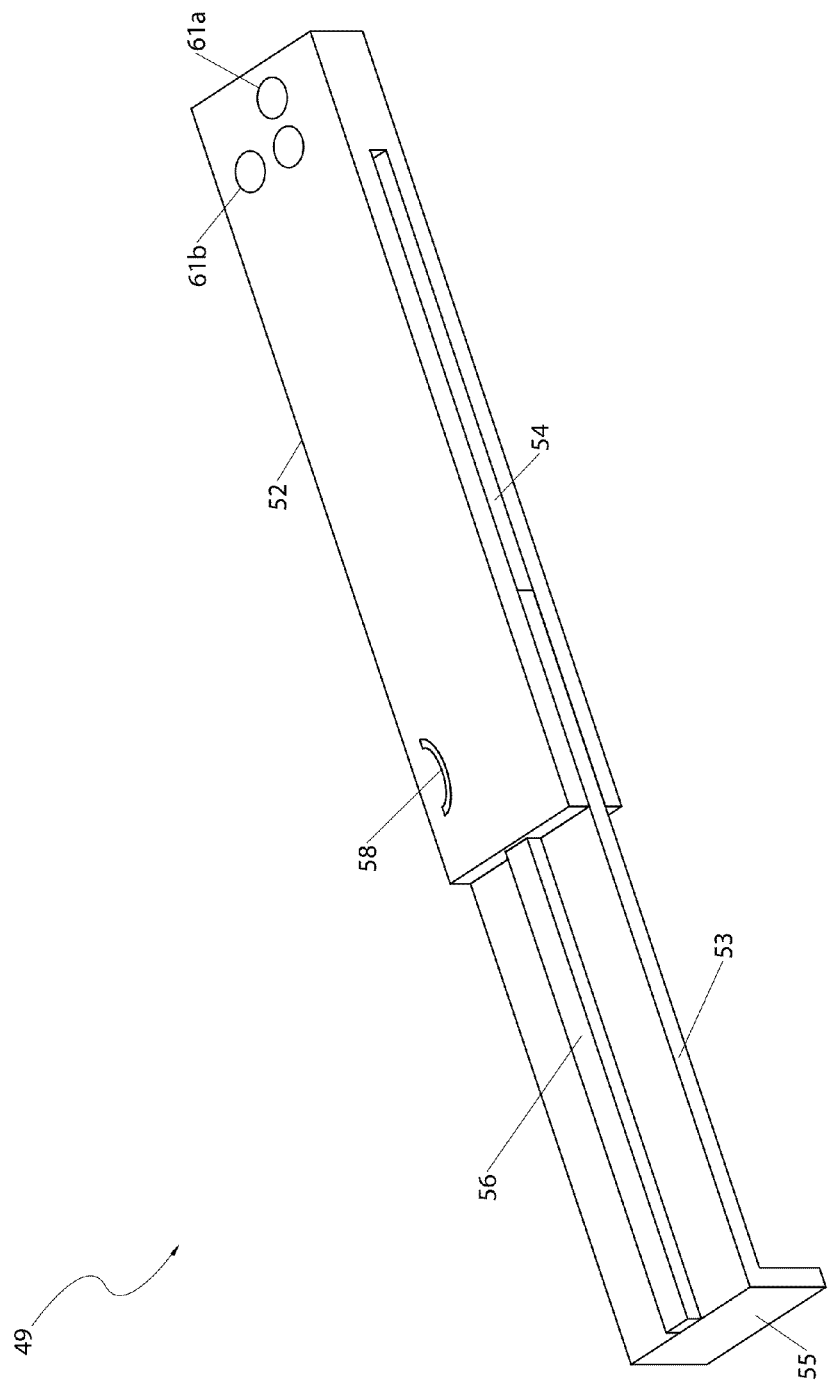
FIG. 12 is a perspective view of an alternate embodiment of the T-square mechanism of FIG. 11; and, FIG. 13 is a perspective left side view of the multi-functional tape measure.

As shown in the example embodiment of FIG. 12, the blade 49 can be extendable to provide additional length for the squaring feature of the device 10. An outer blade 52 is pivotably attached to the housing 20 within the slot 51 and an inner blade 53 is slidably coupled within a longitudinal channel provided in the outer blade 52. The inner blade 53 extends linearly outward from the outer blade 52 to increase the overall length of the blade 49 when needed. The overall width of both the outer blade 52 and inner blade 53 are equivalent to provide coextensive planar side edges when the blade 49 is extended. A stop 55 extends perpendicularly downward from a forward end of the inner blade 53 having a height equal to a lower half of the outer blade 52 for supporting the forward end of the inner blade 53 when extended and maintaining the blade 49 parallel to the work surface.

At least one (1) channel guide 56 can be provided for guiding and retaining the inner blade 53 within the channel 54 of the outer blade 52. The channel guide 56 protrudes outwardly from the top surface, the bottom surface, or both surfaces of the inner blade 53 and slidably mates within corresponding longitudinal cut-outs disposed on the interior of the outer blade 52 having close tolerances with the channel guide 56.

As seen in FIGS. 8 and 9, a small recess 57 can be provided in the housing right side 44, just above the slot 51, for accessing the blade 49 when rotating outwardly for use. A groove 58 can also be provided in a top surface of the outer blade 52 and aligned with the recess 57 to be engaged by a finger of the user.

As best seen in FIGS. 9 and 10, the blade 49 is secured in both the stowed position and deployed position by a spring actuated retaining pin 59. The pin 59 is generally disposed within the housing 20 at the rear end and extended from the top side 40 to the bottom side 47. A lower end 60 of the pin 59 extends from the interior of the housing 20 into the slot 51. The pin lower end 60 is rounded for insertion within one (1) of two (2) blade apertures 61 disposed in the top surface of the blade 49 at the attached end. A stowed blade aperture 61a is positioned to the rear of the fastener for locking the blade 49 in the stowed position. A deployed blade aperture 61b is positioned to the right of the fastener for locking the blade 49 in the deployed position.

A spring 62 is disposed around the pin 59 at a lower portion within the housing 20. The spring 62 is affixed at an upper end to the pin 59 and at a lower end to the housing bottom side 47 for biasing the pin 59 in a downward position and engaging pin lower end 60 with the selected blade aperture 61. It can be appreciated that the spring 62 can be positioned at alternative locations upon the pin 59 and within the housing 20.

An upper end of the pin 59 extends past the housing top side 40 and includes a head 63. When the head 63 is raised by the user, the pin 59 is positioned in an upward position disengaging the blade aperture 61 and allowing the blade 49 in a rotated to a selected position. In other embodiments, a lever is pivotably attached to the housing top side 40 next to the head 63. An end of the lever is positioned under the head 63 and an opposing end is biased upwardly. When the user presses downward on the free end of the lever, the opposing end lifts the head 63 and disengages the pin 59 from the blade 49.

It can be appreciated by one skilled in the art that other styles and configurations of the present invention can be easily incorporated into the teachings of the present disclosure and only certain particular configurations have been shown and described for purposes of clarity and disclosure and not by way of limitation of scope.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. A multi-functional tape measure comprising:
    a housing formed by a first section and a second section;
    an opening disposed in a lower front side of said housing;
    a coiled measuring tape disposed within said housing having a free end that is extendable from said opening while a remainder of said measuring tape remains coiled;
    a topside measuring indicia disposed linearly along a top surface of said measuring tape having a measuring scale initiating at said free end, said topside measuring indicia comprising left-handed indicia extending along a left side of said top surface and opposingly oriented right-handed indicia extending along a right side of said top surface;
    a bottomside measuring indicia disposed linearly along a bottom surface of said measuring tape having an altered measuring scale initiating at a point inward of said free end, said bottomside measuring indicia comprising left-handed indicia extending along a left side of said bottom surface and opposingly oriented right-handed indicia extending along a right side of said bottom surface;

a T-square blade pivotably attached to said housing adapted to form a right angle relative to said housing when in a deployed position and a lip extending from a bottom side of said housing; and, a viewing window disposed in a top side of said housing to display an upper portion of said coiled measuring tape;

wherein said housing further comprises:
a slot having an open side in said right side of said housing for receiving said blade when in a stowed position; and,
a retaining pin biased in a downward position by a spring, said pin having a rounded lower end extending within said slot and selectably insertable within a stowed blade aperture for locking said blade in said stowed position or a deployed blade aperture for locking said blade in said deployed position; and, wherein a measurement of distance displayed through said viewing window is equivalent to a combined length of said measuring tape extended through said opening and a length of said housing.

2. The device of claim 1, wherein said measuring scale includes a plurality of equally spaced markings adapted to measure a distance between said free end and said opening of said housing.

3. The device of claim 1, wherein said altered measuring scale includes a plurality of unequally spaced markings having a correction factor adapted to measure a distance between said free end and a rear side of said housing.

4. The device of claim 1, further comprising:
a vertical level disposed on a right side of said housing for indicating vertical angles of inclination; and,
a horizontal level disposed on said right side of said housing for indicating horizontal angles of inclination.

5. The device of claim 4, wherein a rear side of said housing is flat, parallel to said vertical level, and perpendicular to a bottom side of said housing; a left side of said housing is flat and parallel to said vertical and horizontal levels; and said bottom side of said housing is flat, parallel to said horizontal level, and perpendicular to said vertical level.

6. The device of claim 1, wherein said pin further comprises an upper end extending past said top side of said housing comprising a pin head for raising said pin upwardly to disengage said pin lower end from said blade apertures.

7. The device of claim 6, wherein said blade extendable and comprises:
an outer blade having an interior longitudinal channel; and,
an inner blade slidably attached within said outer blade channel.

8. A multi-functional tape measure comprising:
a housing comprising a top side, a flat bottom side, a right side, a flat left side, a front side, a flat rear side, and an opening disposed in a lower end of said front side;
a coiled measuring tape disposed within said housing having a free end that is extendable from said opening while a remainder of said measuring tape remains coiled, said measuring tape comprising a topside measuring indicia disposed linearly along a top surface of said measuring tape having a measuring scale initiating at said free end, said topside measuring indicia comprising left-handed indicia extending along a left side of said top surface and opposingly oriented right-handed indicia extending along a right side of said top surface and a bottomside measuring indicia disposed linearly along a bottom surface of said measuring tape having an altered measuring scale initiating at a point inward of said free end, said bottomside measuring indicia comprising left-handed indicia extending along a left side of said bottom surface and opposingly oriented right-handed indicia extending along a right side of said bottom surface;

a viewing window disposed in said top side of said housing to display an upper portion of said coiled measuring tape;

a vertical level disposed on said right side of said housing for indicating vertical angles of inclination;

a horizontal level disposed on said right side of said housing for indicating horizontal angles of inclination;

a T-square blade pivotally attached to said housing for forming a right angle relative to said housing when in a deployed position;

a slot having an open side in said right side of said housing for receiving said blade when in a stowed position;

a lip defined by said bottom side of said housing below said slot; and, a retaining pin biased in a downward position by a spring, said pin having a rounded lower end extending within said slot and selectably insertable within a stowed blade aperture for locking said blade in said stowed positions or a deployed blade aperture for locking said blade in said deployed position, an upper end of said pin extending past said top side of said housing comprising a pin head for raising said pin upwardly to disengage said pin lower end from said blade apertures;

wherein a measurement of distance displayed through said viewing window is equivalent to a combined length of said measuring tape extended through said opening and a length of said housing.

9. The device of claim 8, wherein said measuring scale includes a plurality of equally spaced markings adapted to measure a distance between said free end and said opening of said housing.

10. The device of claim 9, wherein said altered measuring scale includes a plurality of unequally spaced markings having a correction factor adapted to measure a distance between said free end and a rear side of said housing.

11. The device of claim 10, wherein said blade extendable and comprises:
an outer blade having an interior longitudinal channel; and,
an inner blade slidably attached within said outer blade channel.

12. The device of claim 11, wherein said viewing window comprises a magnifying lens.

13. The device of claim 12, further comprises a tape locking actuator movably coupled to said housing and a press mechanism mechanically attached to said actuator for selectably locking said measuring tape at a selected extended position.

14. The device of claim 12, further comprising a flexible clip attached to said let side of said housing, said left side of said housing comprising an orifice for entirely receiving said clip.

15. The device of claim 12, wherein said outer blade and said inner blade each have equal widths and coextensively planar side edges.

16. The device of claim 12, wherein said right side of said housing further comprises a recess disposed along a top edge of said slot for accessing said blade.

17. The device of claim 16, wherein said blade further comprises a groove disposed on a top surface aligned with said recess when said blade is in said stowed position.

\* \* \* \* \*